United States Patent
Aggarwal et al.

(10) Patent No.: US 11,455,236 B2
(45) Date of Patent: Sep. 27, 2022

(54) AUTOMATICALLY GENERATING DATASETS BY PROCESSING COLLABORATION FORUMS USING ARTIFICIAL INTELLIGENCE TECHNIQUES

(71) Applicant: International Business Machines Corporation, Armonk, NY (US)

(72) Inventors: Pooja Aggarwal, Bangalore (IN); Zhe Liu, San Jose, CA (US); Prateeti Mohapatra, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/179,629

(22) Filed: Feb. 19, 2021

(65) Prior Publication Data
US 2022/0269589 A1 Aug. 25, 2022

(51) Int. Cl.
G06F 11/36 (2006.01)
G06N 3/08 (2006.01)
G06F 40/205 (2020.01)

(52) U.S. Cl.
CPC ...... *G06F 11/3684* (2013.01); *G06F 11/3688* (2013.01); *G06F 11/3692* (2013.01); *G06F 40/205* (2020.01); *G06N 3/08* (2013.01)

(58) Field of Classification Search
CPC ............ G06F 11/3684; G06F 11/3688; G06F 11/3692; G06F 40/205; G06N 3/08
(Continued)

(56) References Cited

U.S. PATENT DOCUMENTS 6,587,846 B1* 7/2003 LaMuth ............... G06N 3/004
706/21
8,078,978 B2* 12/2011 Perry .................. G06F 40/166
715/752
(Continued)

FOREIGN PATENT DOCUMENTS

CN   108804654 A   11/2018
CN   111930903 A   11/2020

OTHER PUBLICATIONS

Bacchelli et al, "Extracting Structured Data from Natural Language Documents with Island Parsing", IEEE, 476-479 (Year: 2011).*
(Continued)

*Primary Examiner* — Anil Khatri
(74) *Attorney, Agent, or Firm* — Ryan, Mason & Lewis, LLP

(57) ABSTRACT

Methods, systems, and computer program products for automatically generating datasets by processing collaboration forums using artificial intelligence techniques are provided herein. A computer-implemented method includes obtaining conversational data from collaboration forum sources; classifying, using a first set of artificial intelligence techniques, at least a portion of the conversational data into categories based on designated applications; extracting information, pertaining to test case-related issues, from at least a portion of the classified data; verifying at least a portion of the extracted information by analyzing, using a second set of artificial intelligence techniques, portions of the conversational data attributed to multiple entities and related to the extracted information; generating, using the verified information, one or more datasets related to at least one of the test case-related issues for at least one of the designated applications; performing at least one automated action based on the one or more generated datasets.

12 Claims, 7 Drawing Sheets

(58) Field of Classification Search
USPC .............................. 717/124–140; 706/12–45
See application file for complete search history.

(56) References Cited

U.S. PATENT DOCUMENTS

| | | | | |
|---|---|---|---|---|
| 8,156,060 | B2* | 4/2012 | Borzestowski | G06N 5/04 706/45 |
| 8,660,970 | B1* | 2/2014 | Fiedorowicz | H04L 67/30 706/14 |
| 10,585,784 | B2* | 3/2020 | Diamanti | G06F 16/00 |
| 10,684,851 | B2 | 6/2020 | Burli et al. | |
| 10,705,892 | B2* | 7/2020 | Riva | G06N 3/0427 |
| 10,747,823 | B1* | 8/2020 | Birnbaum | G06N 5/041 |
| 10,755,046 | B1* | 8/2020 | Lewis Meza | G06F 40/205 |
| 10,817,782 | B1* | 10/2020 | Rando | G06F 40/205 |
| 10,818,293 | B1* | 10/2020 | Orkin | G06F 16/9038 |
| 10,930,285 | B1* | 2/2021 | Orkin | G06F 40/35 |
| 10,943,072 | B1* | 3/2021 | Jaganmohan | G06N 5/041 |
| 11,115,353 | B1* | 9/2021 | Crowley | G10L 15/183 |
| 11,381,677 | B2* | 7/2022 | McDole | H04M 3/5183 |
| 2019/0188574 | A1 | 6/2019 | Menon et al. | |
| 2020/0057858 | A1 | 2/2020 | Sharma et al. | |
| 2020/0104639 | A1 | 4/2020 | Didari et al. | |

OTHER PUBLICATIONS

Yi et al, "Sentiment Analyzer: Extracting Sentiments about a Given Topic using Natural Language Processing Techniques", IEEE, pp. 1-8 (Year: 2003).*

Zhang et al, "Rule-based Extraction of Spatial Relations in Natural Language Text", IEEE, pp. 1-4 (Year: 2009).*

Song et al, "Time-series well performance prediction based on Long Short-Term Memory (LSTM) neural network model", Journal of Petroleum Science and Engineering, pp. 1-11 (Year: 2019).*

Hua et al, "Deep Learning with Long Short-Term Memory for Time Series Prediction", IEEE, pp. 114-119 (Year: 2019).*

Helen et al, "Emotional Context Detection on Conversation Text with Deep Learning Method Using Long Short-Term Memory and Attention Networks", IEEE, pp. 674-678 (Year: 2021).*

Bunga et al, "Developing a Complete Dialogue System Using Long Short-Term Memory", IEEE, pp. 326-329 (Year: 2019).*

Lee et al, "Boomerang: Proactive Insight-Based Recommendations for Guiding Conversational Data Analysis", ACM, pp. 2750-2754 (Year: 2021).*

Elsner et al., You talking to me? A Corpus and Algorithm for Conversation Disentanglement, ACL 2008.

Kummerfeld et al., A Large-Scale Corpus for Conversation Disentanglement, ACL 2019.

Liu et al., Attention-Based Recurrent Neural Network Models for Joint Intent Detection and Slot Filling, Sep. 2016.

Mell et al., National Institute of Standards and Technology, The NIST Definition of Cloud Computing, Special Publication 800-145, Sep. 2011.

Zhang, Congpin et al. Research and Application of Named Entity Recognition Based on LSTM-CRF Computer Technology and Development, Feb. 28, 2019, No. 2, vol. 29, pp. 107-108.

* cited by examiner

AUTOMATICALLY GENERATING DATASETS BY PROCESSING COLLABORATION FORUMS USING ARTIFICIAL INTELLIGENCE TECHNIQUES

BACKGROUND

The present application generally relates to information technology and, more particularly, to data processing techniques. More specifically, feature testing is a process typically carried out for new features to be added to one or more systems, applications, etc. As part of the feature testing process, one or more required sets of ground truth test data needs to be created. As used herein, a ground truth dataset (also called a gold standard dataset) refers to labeled data which includes inputs and expected outputs. However, conventional dataset generation techniques commonly involve labor-intensive and cumbersome series of tasks which often present temporal and resource-related challenges.

SUMMARY

In one embodiment of the present invention, techniques for automatically generating datasets by processing collaboration forums using artificial intelligence techniques are provided. An exemplary computer-implemented method can include obtaining conversational data from one or more collaboration forum sources, and classifying, using a first set of one or more artificial intelligence techniques, at least a portion of the obtained conversational data into one or more categories based at least in part on one or more designated applications. The method also includes extracting information, pertaining to one or more test case-related issues, from at least a portion of the classified conversational data, and verifying at least a portion of the extracted information by analyzing, using a second set of one or more artificial intelligence techniques, portions of the conversational data attributed to multiple entities and related to the extracted information. Further, the method includes generating, using the verified information, one or more datasets related to at least one of the one or more test case-related issues for at least one of the one or more designated applications, and performing at least one automated action based at least in part on the one or more generated datasets.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
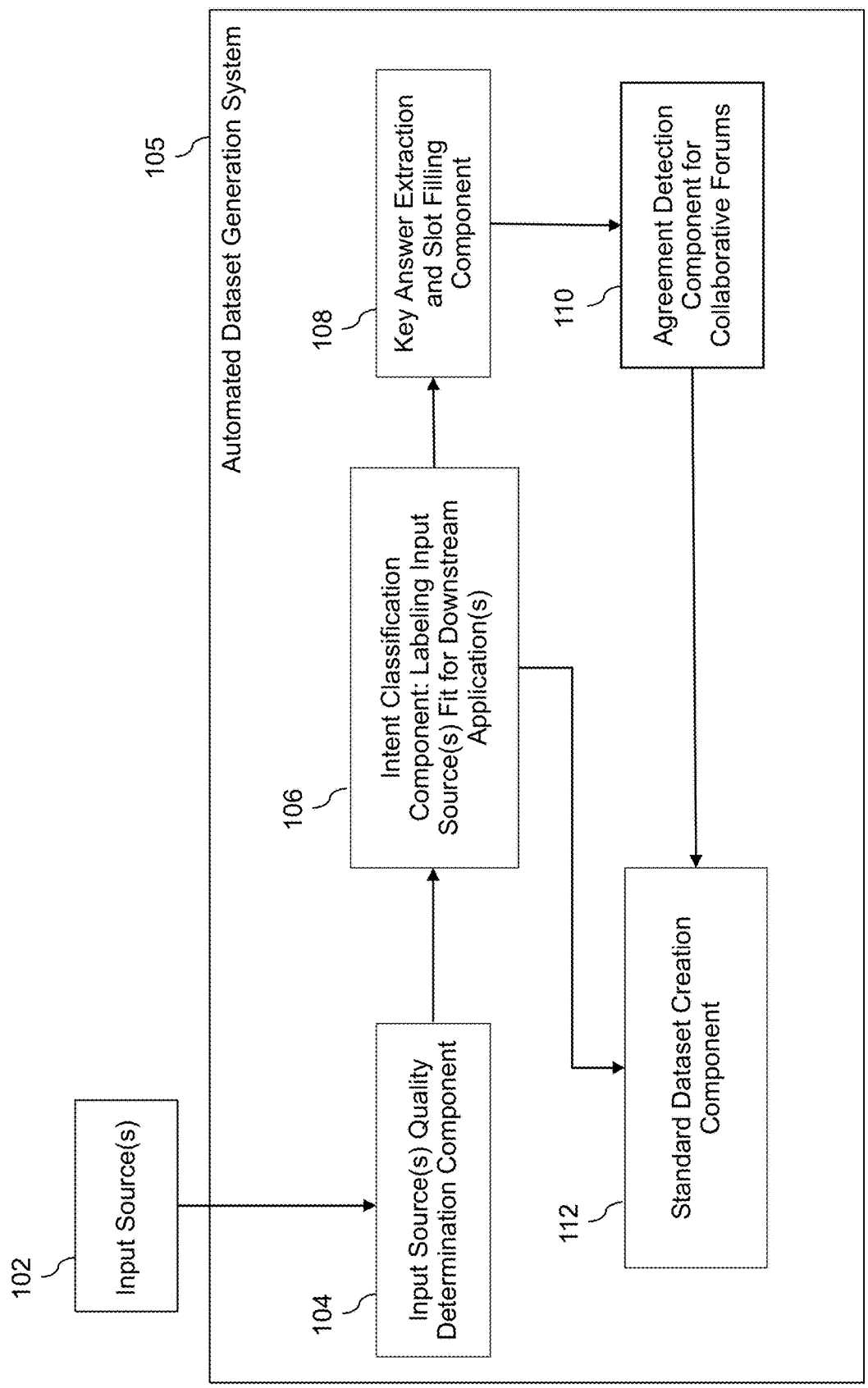
FIG. 1 is a diagram illustrating system architecture, according to an exemplary embodiment of the invention.

As described herein, at least one embodiment includes automatically generating datasets by processing collaboration forums using artificial intelligence techniques. Such an embodiment can include generating at least one ground truth dataset for one or more test cases to validate applications such as fault localization, incident similarity, resolution recommendation, anomaly detection, etc., by analyzing and/or verifying information collected from collaborative forum sources (e.g., group chats, open source communities, message boards, workflow management tools, etc.). Such information, in one or more embodiments, can include information related to test cases of one or more particular applications from various channels (as noted above), and such data sources can contain not only structured data, but also unstructured data (e.g., text, etc.).

At least one embodiment also includes classifying test cases collected from such various channels. By way of example, once the data are collected, such an embodiment includes mapping at least a portion of the data to one or more downstream tasks. For instance, if extracted text pertains to the resolution performed to solve an issue, then that text can be mapped to the downstream task of action recommendation. Accordingly, one or more embodiments include generating at least one ground truth test dataset for various downstream applications such as, for example, fault localization, incident similarity, resolution recommendation, anomaly detection, etc. Additionally, at least one embodiment includes extracting knowledge of at least a portion of the applications from the classified test cases based at least in part on the mapped data. Such knowledge (which can be considered as output labels) can include, for example, details of an application such as important components, key actions performed, key faults observed in a system, etc.

Further, such an embodiment can include analyzing and/or verifying the correctness and/or validity of at least a portion of the collected test cases, based at least in part on the extracted knowledge, to generate one or more ground truth datasets to be used to test at least a portion of the applications. In accordance with one or more embodiments, in order to generate a test case, at least one output label is required, and as detailed herein, such embodiments include checking and/or analyzing an agreement between the various entities involved.

As noted above and further detailed herein, at least one embodiment includes extract information from segmented conversations (e.g., derived from a collaborative forum). In such an embodiment, one or more features can be used, for example, to determine if two utterances, i and j, are part of the same conversation or not. One such feature includes using the thread structure, wherein if i and j are part of the same threaded structure, then i and j are determined to be part of the same conversation. Another such feature includes using temporal information, wherein if i and j are temporally in close proximity, then i and j are determined to be part of the same conversation. Yet another such feature includes detecting if i and j are question-answer pairs, and if i and j are determined to be question-answer pairs, then i and j are determined to be part of the same conversation. Also, another such feature includes using topic keywords and/or sentence embeddings to determine if i and j are similar, and if i and j are deemed to be similar, then i and j are determined to be part of the same conversation. Further, yet another such feature includes taking context utterances and related keywords for i and j to determine if i and j are part of the same conversation.

FIG. 1 is a diagram illustrating system architecture, according to an embodiment of the invention. By way of illustration, FIG. 1 depicts one or more input sources 102 and automated dataset generation system 105, which includes multiple components (e.g., components 104, 106, 108, 110, and 112), as further detailed below. More specifically, input source(s) 102 provides input data to input source(s) quality determination component 104, which performs one or more filtering and/or preprocessing actions on at least a portion of the input data. Such preprocessing steps can include, for example, segmenting the input data into various chunks (as, generally, such conversations are interleaved). The remaining and/or preprocessed data output from component 104 is provided to intent classification component 106, which, as further detailed in connection with FIG. 2 and FIG. 3, labels the input source(s) of the data for downstream application(s).

At least portions of the output from the intent classification component 106 are provided to standard dataset creation component 112 as well as to key answer extraction and slot filling component 108 (which extracts and/or inserts important entity identifications and/or key action identifications). Output from component 108 is provided to agreement detection component 110, which processes the provided information to determine and/or detect agreement(s) from one or more collaborative forums. More specifically, from the answers extracted by component 108, one or more embodiments include checking and/or determining whether one or more of the answers are correct or not.

For example, using data from group chats and/or workflow management tools, such an embodiment can include observing that site reliability engineers (SREs) mention that a given problem is in a particular component, but later one or more other entities reply with a different observation and an explanation. It is to be noted that not every mention of an answer is correct, and as such, one or more embodiments include determining which such answers are correct. Such an embodiment includes using at least one conditional random fields (CRFs) based sequential model to make predictions on the basis of a sentence-level and/or a segment-level. In connection with such an embodiment, features used for identifying agreements and/or disagreements among answers can include one or more lexical features, one or more sentiment-based features, and one or more structural features.

As detailed herein, CRFs refer to a class of techniques that can be applied, for example, in pattern recognition and machine learning contexts, and can be used for structured predictions. While a classifier predicts a label for a single sample without considering neighboring samples, a CRF can take context into account. For example, in one or more embodiments, at least one CRF model can be implemented and consider context in the form of preceding message segments. Additionally, based on the final output, such an embodiment can include assigning a label to each input.

Based at least in part on the determined level of agreement, output from component 110 is provided to standard dataset creation component 112, which creates at least one dataset to be used, for example, in one or more feature testing operations. In at least one embodiment, creating such a dataset can include, using labeled and/or classified input sources and the answers extracted after agreement processing (via component 110, for example), processing associated information such as, for example, logs, alerts, problem logs, etc., to create the required dataset depending upon the downstream application(s). In one or more embodiments, an example output can include a two-column dataframe, wherein one column is directed to the input and the second column is directed to the output. In the case of fault localization, for instance, one column can contain the alert information (e.g., the details of the error reported by the system) and the other column can contain identification information of the component responsible for the fault.

As noted above and further described below, one or more embodiments include intent classification techniques. By way of example, such techniques can include using predetermined intent categories such as, for example, impact measurements, fault localization, incident and/or alert similarity, fault isolation, etc. More specifically, an impact measurements intent category can pertain to utterances describing error measurements and service and/or customer impacts of one or more faults. A fault localization intent category can pertain to utterances depicting checked and/or possible locations of one or more faults. Also, an incident and/or alert similarity intent category can pertain to utterances depicting whether particular alerts and/or incidents are similar or not. Additionally, a fault isolation intent category can pertain to utterances depicting root cause fault location information of one or more incidents. Further, one or more embodiments can include other intent categories, which can pertain to utterances covering other topics.

Figure 2:
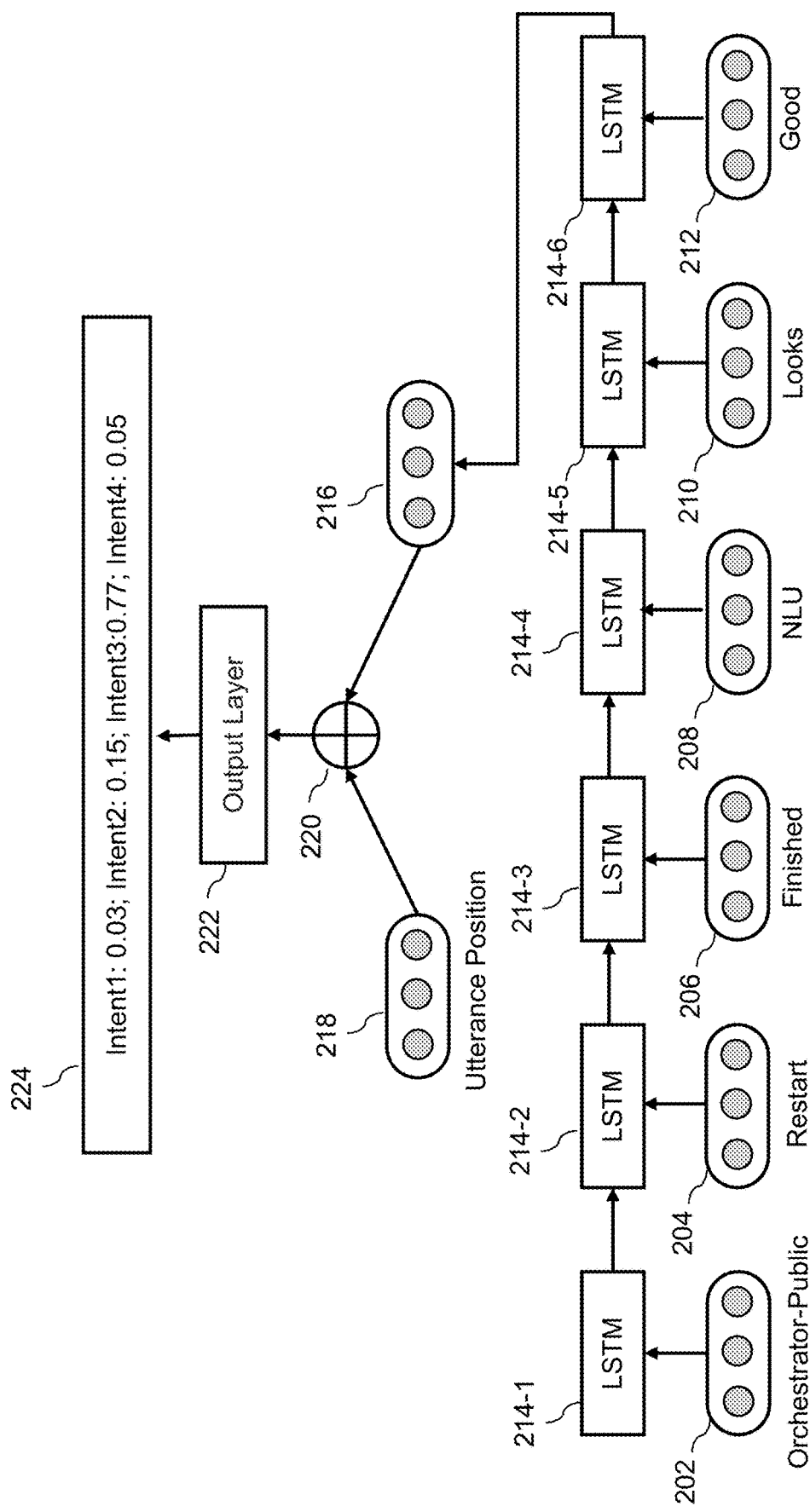
FIG. 2 is a diagram illustrating intent classification for dialogue utterances, according to an exemplary embodiment of the invention.

FIG. 2 is a diagram illustrating intent classification for dialogue utterances, according to an exemplary embodiment of the invention. By way of illustration, FIG. 2 depicts instances of a long short term memory (LSTM) model, 214-1 through 214-6 (collectively referred to herein as LSTM model 214), used for intent classification. To this model 214, a current utterance is specified in a tokenized manner, denoted by tokens 202 through 212, and also the sequential position of the utterance in the conversation. These two components, denoted by token component 216 and utterance position component 218, are combined (as illustrated via element 220) and used via output layer 222 to generate an understanding, denoted by element 224, that the user utterance is related to one or more particular tasks or intents.

Figure 3:
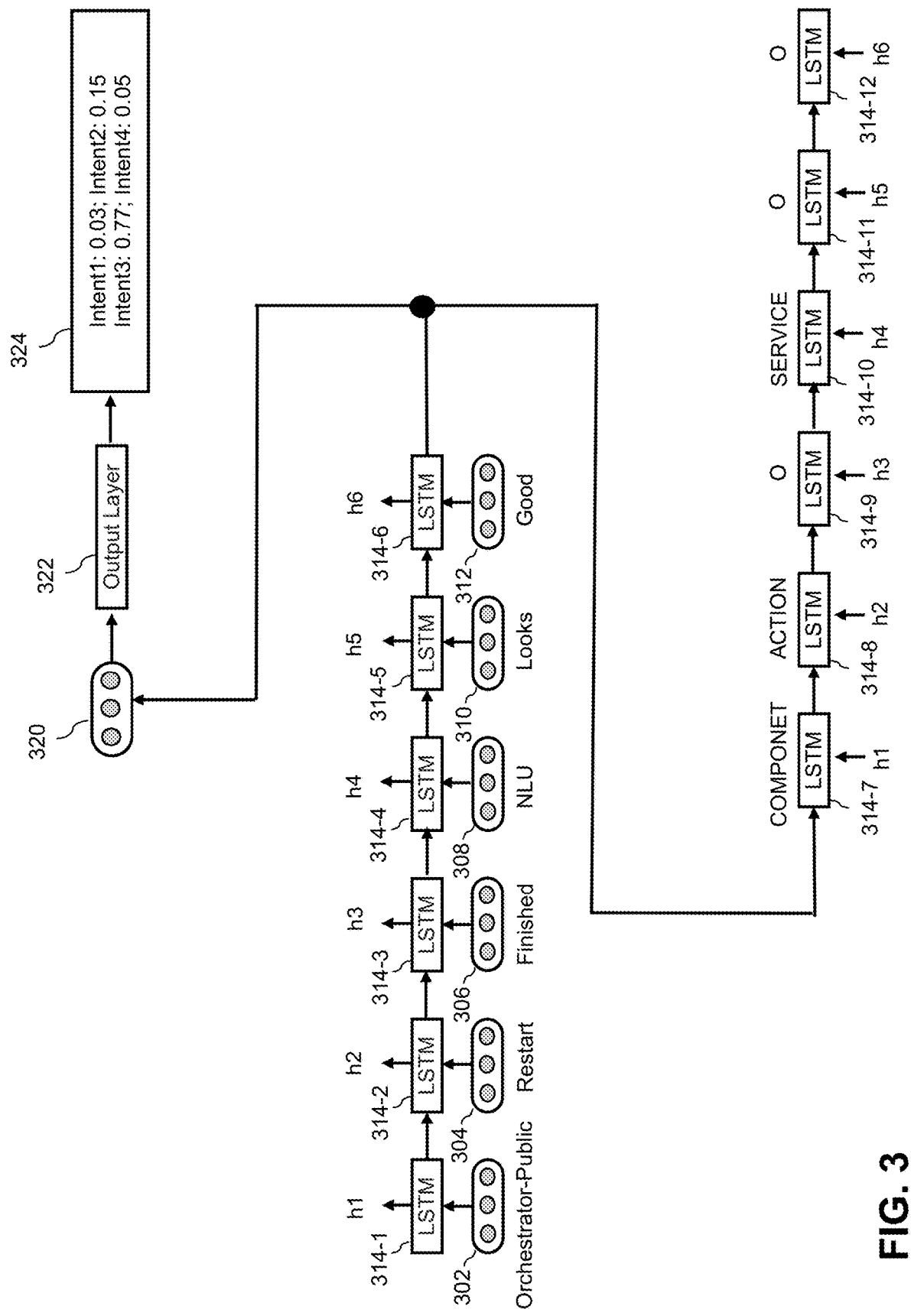
FIG. 3 is a diagram illustrating intent classification and slot filling for dialogue utterances, according to an exemplary embodiment of the invention.

FIG. 3 is a diagram illustrating intent classification and slot filling for dialogue utterances, according to an exemplary embodiment of the invention. By way of illustration, FIG. 3 depicts an embodiment similar to that depicted in FIG. 2, but with one or more additional features. Specifically, along with intent classification (similar to that illustrated in FIG. 2 and depicted via tokens 302 through 312, LSTM model instances 314-1 through 314-6, and output-related elements 320 through 324), FIG. 3 also depicts performing type detection for each of the tokens, as illustrated via TM model instances 314-7 through 314-12. Accordingly, the user can obtain more information regarding the entities specified in the utterance (e.g., detected token types such as "component," "action," and "other" (O)).

Figure 4:
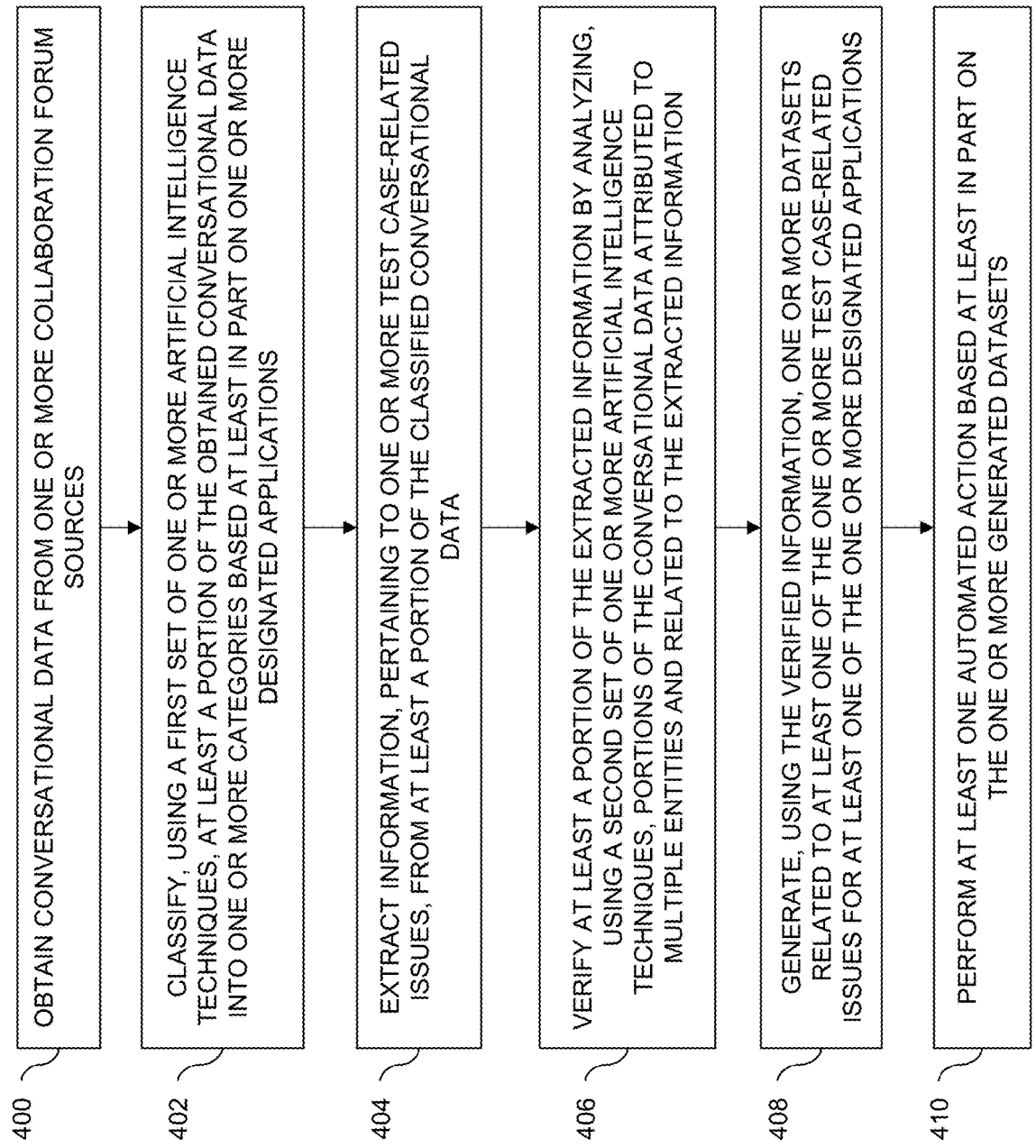
FIG. 4 is a flow diagram illustrating techniques according to an embodiment of the invention.

FIG. 4 is a flow diagram illustrating techniques according to an embodiment of the present invention. Step 400 includes obtaining conversational data from one or more collaboration forum sources. In one or more embodiments, the one or more collaboration forum sources can include one or more group chats, one or more open source communities, one or more message boards, and/or one or more workflow management tools. Additionally, in such an embodiment, the conversational data can include structured data and unstructured data.

Step 402 includes classifying, using a first set of one or more artificial intelligence techniques, at least a portion of the obtained conversational data into one or more categories based at least in part on one or more designated applications. In at least one embodiment, using the first set of one or more artificial intelligence techniques includes using at least one recurrent neural network (e.g., at least one LSTM network) to map the at least a portion of the obtained conversational data to one or more application tasks associated with the one or more categories. Step 404 includes extracting information, pertaining to one or more test case-related issues, from at least a portion of the classified conversational data.

Step 406 includes verifying at least a portion of the extracted information by analyzing, using a second set of one or more artificial intelligence techniques, portions of the conversational data attributed to multiple entities and related to the extracted information. In at least one embodiment, using the second set of one or more artificial intelligence techniques includes processing the portions of the conversational data, in conjunction with the at least a portion of the extracted information, using at least one conditional random fields-based model.

Step 408 includes generating, using the verified information, one or more datasets related to at least one of the one or more test case-related issues for at least one of the one or more designated applications. In one or more embodiments, the one or more designated applications include one or more fault localization applications, one or more incident similarity applications, one or more resolution recommendation applications, and/or one or more anomaly detection applications.

Step 410 includes performing at least one automated action based at least in part on the one or more generated datasets. In at least one embodiment, performing the at least one automated actions includes automatically performing feature testing for at least one of the one or more designated applications using at least one of the one or more generated datasets.

Also, one or more embodiments include automatically updating the first set of one or more artificial intelligence techniques and/or the second set of one or more artificial intelligence techniques based at least in part on the one or more generated datasets. Additionally or alternatively, in accordance with at least one embodiment, software implementing the techniques depicted in FIG. 4 can be provided as a service in a cloud environment.

The techniques depicted in FIG. 4 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 4 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 5:
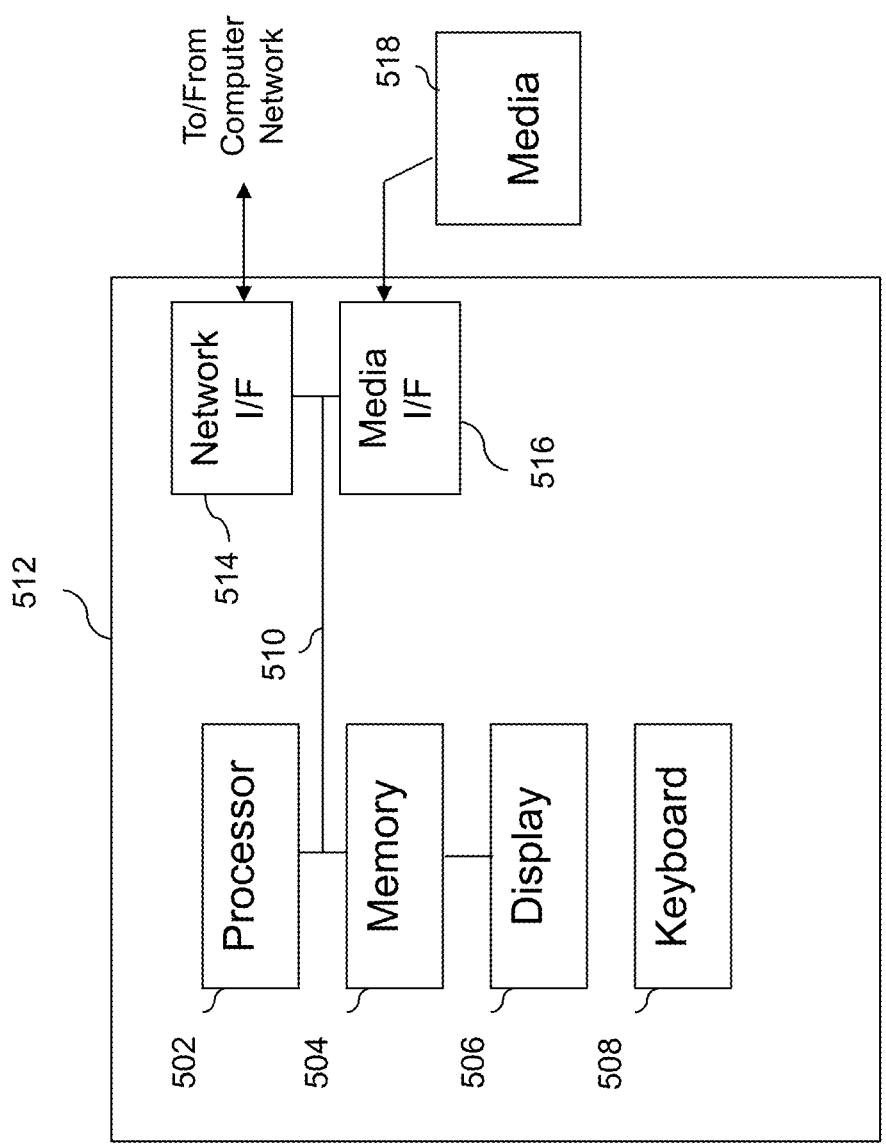
FIG. 5 is a system diagram of an exemplary computer system on which at least one embodiment of the invention can be implemented.

Additionally, an embodiment of the present invention can make use of software running on a computer or workstation. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 502. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
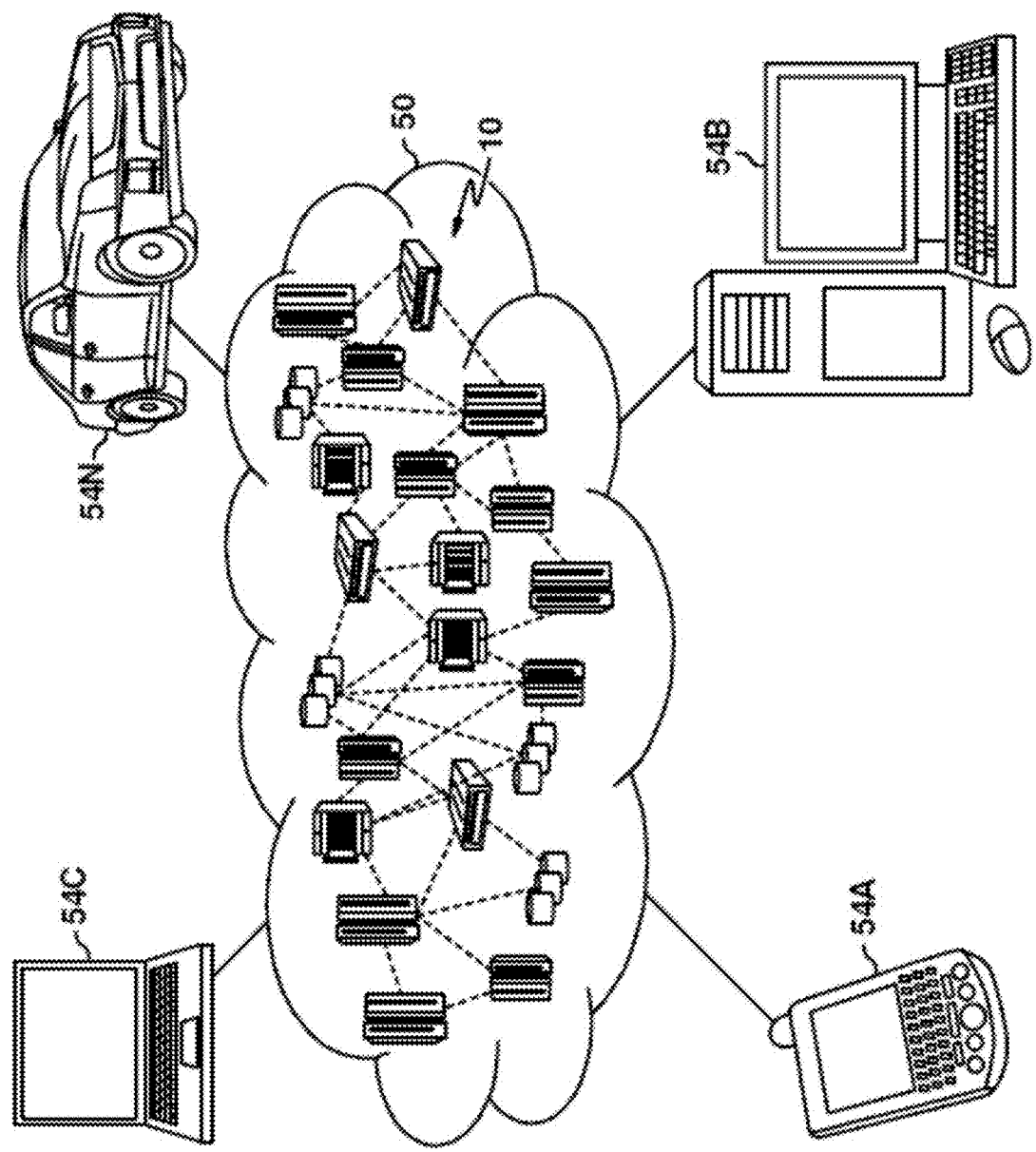
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
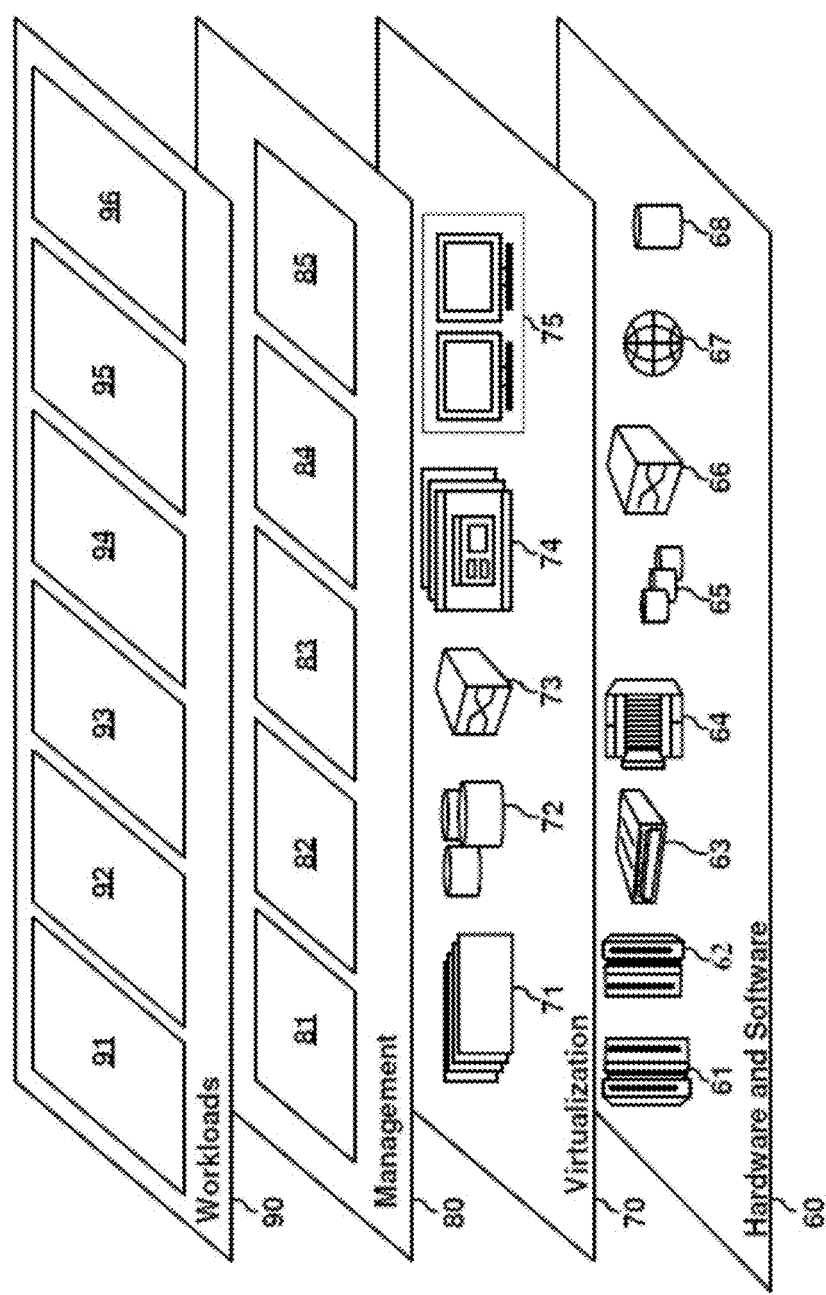
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automated dataset generation 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, automatically generating datasets by processing collaboration forums using artificial intelligence techniques.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   obtaining conversational data from one or more collaboration forum sources, wherein the conversational data comprise structured data and unstructured data;
   classifying, using a first set of one or more artificial intelligence techniques, at least a portion of the obtained conversational data into one or more categories based at least in part on one or more designated applications,
   wherein using the first set of one or more artificial intelligence techniques comprises mapping, using at least one long short-term memory (LSTM) network, the at least a portion of the obtained conversational data to one or more application tasks associated with the one or more categories;
   extracting information, pertaining to one or more test case-related issues, from at least a portion of the classified conversational data;
   verifying at least a portion of the extracted information by analyzing, using a second set of one or more artificial intelligence techniques, portions of the conversational data attributed to multiple entities and related to the extracted information;
   generating, using the verified information, one or more datasets related to at least one of the one or more test case-related issues for at least one of the one or more designated applications; and
   performing at least one automated action based at least in part on the one or more generated datasets, wherein performing at least one automated actions comprises automatically executing feature testing for at least one of the one or more designated applications using at least one of the one or more generated datasets;

wherein the method is carried out by at least one computing device.

2. The computer-implemented method of claim 1, wherein using the second set of one or more artificial intelligence techniques comprises processing the portions of the conversational data, in conjunction with the at least a portion of the extracted information, using at least one conditional random fields-based model.

3. The computer-implemented method of claim 1, wherein the one or more collaboration forum sources comprise at least one of one or more group chats, one or more open source communities, one or more message boards, and one or more workflow management tools.

4. The computer-implemented method of claim 1, wherein the one or more designated applications comprise at least one of one or more fault localization applications, one or more incident similarity applications, one or more resolution recommendation applications, and one or more anomaly detection applications.

5. The computer-implemented method of claim 1, further comprising:
automatically updating the first set of one or more artificial intelligence techniques based at least in part on the one or more generated datasets.

6. The computer-implemented method of claim 1, further comprising:
automatically updating the second set of one or more artificial intelligence techniques based at least in part on the one or more generated datasets.

7. The computer-implemented method of claim 1, wherein software implementing the method is provided as a service in a cloud environment.

8. A computer program product comprising a non-transitory computer readable storage medium having program instructions embodied therewith, the program instructions executable by a computing device to cause the computing device to:
obtain conversational data from one or more collaboration forum sources, wherein the conversational data comprise structured data and unstructured data;
classify, using a first set of one or more artificial intelligence techniques, at least a portion of the obtained conversational data into one or more categories based at least in part on one or more designated applications,
wherein using the first set of one or more artificial intelligence techniques comprises mapping, using at least one LSTM network, the at least a portion of the obtained conversational data to one or more application tasks associated with the one or more categories;
extract information, pertaining to one or more test case-related issues, from at least a portion of the classified conversational data;
verify at least a portion of the extracted information by analyzing, using a second set of one or more artificial intelligence techniques, portions of the conversational data attributed to multiple entities and related to the extracted information;
generate, using the verified information, one or more datasets related to at least one of the one or more test case-related issues for at least one of the one or more designated applications; and
perform at least one automated action based at least in part on the one or more generated datasets, wherein performing at least one automated actions comprises automatically executing feature testing for at least one of the one or more designated applications using at least one of the one or more generated datasets.

9. The computer program product of claim 8, wherein using the second set of one or more artificial intelligence techniques comprises processing the portions of the conversational data, in conjunction with the at least a portion of the extracted information, using at least one conditional random fields-based model.

10. The computer program product of claim 8, wherein the program instructions executable by the computing device further cause the computing device to:
automatically update the first set of one or more artificial intelligence techniques based at least in part on the one or more generated datasets.

11. The computer program product of claim 8, wherein the program instructions executable by the computing device further cause the computing device to:
automatically update the second set of one or more artificial intelligence techniques based at least in part on the one or more generated datasets.

12. A system comprising:
a memory configured to store program instructions; and
a processor operatively coupled to the memory to execute the program instructions to:
obtain conversational data from one or more collaboration forum sources, wherein the conversational data comprise structured data and unstructured data;
classify, using a first set of one or more artificial intelligence techniques, at least a portion of the obtained conversational data into one or more categories based at least in part on one or more designated applications,
wherein using the first set of one or more artificial intelligence techniques comprises mapping, using at least one LSTM network, the at least a portion of the obtained conversational data to one or more application tasks associated with the one or more categories;
extract information, pertaining to one or more test case-related issues, from at least a portion of the classified conversational data;
verify at least a portion of the extracted information by analyzing, using a second set of one or more artificial intelligence techniques, portions of the conversational data attributed to multiple entities and related to the extracted information;
generate, using the verified information, one or more datasets related to at least one of the one or more test case-related issues for at least one of the one or more designated applications; and
perform at least one automated action based at least in part on the one or more generated datasets, wherein performing at least one automated actions comprises automatically executing feature testing for at least one of the one or more designated applications using at least one of the one or more generated datasets.

* * * * *